(12) United States Patent
Jensen (10) Patent No.: US 10,222,197 B2
(45) Date of Patent: Mar. 5, 2019

(54) INTERFEROMETRIC DISTANCE MEASURING ARRANGEMENT FOR MEASURING SURFACES AND CORRESPONDING METHOD WITH AT LEAST TWO PARALLEL MEASUREMENT CHANNELS AND WAVELENGTH RAMP

(71) Applicant: HEXAGON TECHNOLOGY CENTER GMBH, Heerbrugg (CH)

(72) Inventor: Thomas Jensen, Rorschach (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 87 days.

(21) Appl. No.: 14/416,514

(22) PCT Filed: Jul. 18, 2013

(86) PCT No.: PCT/EP2013/065224
§ 371 (c)(1),
(2) Date: Jan. 22, 2015

(87) PCT Pub. No.: WO2014/016201
PCT Pub. Date: Jan. 30, 2014

(65) Prior Publication Data
US 2015/0176970 A1 Jun. 25, 2015

(30) Foreign Application Priority Data
Jul. 24, 2012 (EP) ..................................... 12177615

(51) Int. Cl.
*G01B 9/02* (2006.01)
*G01B 11/14* (2006.01)

(52) U.S. Cl.
CPC ..... *G01B 9/02091* (2013.01); *G01B 9/02004* (2013.01); *G01B 9/0205* (2013.01);
(Continued)

(58) Field of Classification Search
CPC .......................... G01B 9/02091; G01B 9/02044; G01B 11/14; G01B 9/02027; G01B 9/02004; G01B 9/02057; G01B 9/0205
See application file for complete search history.

(56) References Cited

U.S. PATENT DOCUMENTS

| 5,402,582 A | 4/1995 | Raab | |
|---|---|---|---|
| 6,341,036 B1 * | 1/2002 | Tearney | ............... A61B 5/0066 359/209.1 |

(Continued)

FOREIGN PATENT DOCUMENTS

| CN | 1297536 A | 5/2001 |
|---|---|---|
| CN | 102183821 A | 9/2011 |

(Continued)

OTHER PUBLICATIONS https://en.wikipedia.org/wiki/Optical_coherence_tomography, May 26, 2017.*

(Continued)

*Primary Examiner* — Hwa Lee
(74) *Attorney, Agent, or Firm* — Maschoff Brennan (57) ABSTRACT

The invention relates to an interferometric distance measuring arrangement for measuring surfaces, using at least one laser which can be tuned for generating measurement radiation modulated by a wave length ramp, an optical beam path with an optical transmitting system for emitting the measurement radiation to the surface and an optical capturing system for capturing the measurement radiation back-scattered by the surface, comprising a measuring arm and a reference arm and a radiation detector and an evaluation unit for determining the distance from a reference point of the distance measuring device to the surface. Channels are defined by at least one beamsplitter n≥2 for the parallel emission of measurement radiation, respectively, one differ- (Continued)

ent sub area of the wave length ramp is allocated to said channels at a predetermined emission time point.

18 Claims, 7 Drawing Sheets

(52) U.S. Cl.
CPC ..... *G01B 9/02027* (2013.01); *G01B 9/02044* (2013.01); *G01B 9/02057* (2013.01); *G01B 11/14* (2013.01)

(56) References Cited

U.S. PATENT DOCUMENTS

| | | | |
|---|---|---|---|
| 6,434,292 | B1 | 8/2002 | Kim et al. |
| 6,724,485 | B1 | 4/2004 | Drabarek |
| 9,677,870 | B2 | 6/2017 | Jensen |
| 2005/0052656 | A1 | 3/2005 | Lindner et al. |
| 2006/0055936 | A1* | 3/2006 | Yun .................... G01N 21/4795 356/479 |
| 2007/0002327 | A1 | 1/2007 | Zhou et al. |
| 2010/0312524 | A1 | 12/2010 | Siercks et al. |
| 2013/0100455 | A1* | 4/2013 | Tearney ............... A61B 5/0062 356/479 |
| 2015/0176969 | A1 | 6/2015 | Jensen |

FOREIGN PATENT DOCUMENTS

| | | |
|---|---|---|
| DE | 43 25 337 A1 | 2/1994 |
| DE | 43 25 347 A1 | 2/1994 |
| DE | 198 08 273 A1 | 9/1999 |
| EP | 1 474 650 A2 | 6/2007 |
| EP | 2541193 A1 | 1/2013 |
| EP | 2690395 A1 | 1/2014 |
| WO | 2009/036861 A1 | 3/2009 |

OTHER PUBLICATIONS

OCT Tutorial. Wasatch Photonics, http://wasatchphotonics.com/oct-tutorial/, printed on Mar. 20, 2018.*
Rooney, Denise E. Human Cytogenetics: Constitutional Analysis : a Practical Approach, 3$^{rd}$ ed.vol. 1,Oxford University Press, p. 249.*
European Search Report dated Nov. 7, 2012 as received in Application No. 12 17 7615.
Megahertz OCT for ultrawide-field retinal imaging with a 1050 nm Fourier domain mode-locked laser, Opt. Express 19, 3044-3062, Feb. 14, 2011.
Y.K. Tao et al., "High-speed complex conjugate resolved retinal spectral domain optical coherence tomography using sinusoidal phase modulation", Opt. Lett. 32, 2918, Oct. 15, 2007.
S.W. Lee et al., "Line-field optical coherence tomography using frequency-sweeping source", IEEE J. Selec. Top. Quant. Electr. 14, 50, Jan./Feb. 2008.
J. Sun et al., "MEMS-based endoscopic OCT", Int. J. of Opt., Jan. 31, 2011.
T. Dresel, G. Häusler, and H. Venzke, "Three-dimensional sensing of rough surfaces by coherence radar," Appl. Opt. 31, 919-925 (1992).
Y. Mao et al., "Simultaneous multi-wavelength-band optical frequency domain imaging for spectroscopic investigations" Proc. SPIE 8155, Infrared Sensors, Devices, and Applications; and Single Photon Imaging II, 81551A (Sep. 16, 2011).
Wang, L., Ding, Z., Wu, T., & Wang, K. (Nov. 2007). Wavelength encoded OCT imaging using swept-source. In Photonics Asia 2007 (pp. 68261V-68261V). International Society for Optics and Photonics.
Beau A Standish et al.: "In vivo endoscopic multi-beam optical coherence tomography", Physics in Medicine and Biology, Institute of Physics Publishing, Bristol GB, Bd. 55, No. 3, Feb. 7, 2010, pp. 615-622.

\* cited by examiner

INTERFEROMETRIC DISTANCE MEASURING ARRANGEMENT FOR MEASURING SURFACES AND CORRESPONDING METHOD WITH AT LEAST TWO PARALLEL MEASUREMENT CHANNELS AND WAVELENGTH RAMP

FIELD OF THE INVENTION

The invention relates to an interferometric distance measuring arrangement for measuring surfaces and a method for interferometric distance measuring for measuring surfaces.

BACKGROUND

In many areas of application there is a need to measure surfaces of objects and thus the objects themselves with high accuracy. This applies to the manufacturing industry, in particular, for which high importance is attached to measuring and checking surfaces of workpieces. For these applications there are a number of measuring apparatuses which are designed for specific tasks and are also designated as coordinate measuring apparatuses or machines. These measuring apparatuses measure the surface by establishing a mechanical contact and scanning the surface. Examples thereof include gantry measuring machines, as described, e.g., in DE 43 25 337 or DE 43 25 347. A different system is based on the use of an articulated arm whose measuring sensor arranged at the end of the multipartite arm can be moved along the surface. Generic articulated arms are described for example in U.S. Pat. No. 5,402,582 or EP 1 474 650. Other methods use optical measurement radiation in order to be able to scan surfaces without contact.

One approach known from the prior art is based here on interferometric methods, such as, for example, optical coherence tomography (OCT), such as are described for example in WO 2009/036861 or the European patent application having the application 11171582.7. The distance measuring methods disclosed therein use, for the purpose of measuring surfaces, a frequency-modulated laser beam for providing measurement radiation, which is emitted onto the surface. The measurement radiation backscattered from the surface is received again and serves for interferometrically measuring the distance from a reference point to the surface, i.e. in the so-called z-direction, wherein a measurement arm and a reference arm are used.

In most exemplary embodiments, the surface is scanned by means of a single measurement channel that measures the distance to a point on the surface, wherein the surface is implemented by the entire probe head being moved over the path of measurement points on the surface. For a multiplicity of applications there is a need, however, to scan a relatively large number of points in a distance-measuring fashion simultaneously or in rapid succession, without this necessitating moving the probe head with the optical system in order over each point to be measured.

One approach known from the prior art consists in using one- or two-dimensionally scanning mirrors in order to be able to move the measurement beam over the surface, without this necessitating a movement of the probe head or the entire measuring arrangement. Corresponding realizations with micromechanical elements for interferometric measuring arrangements in the medical field are described for example in J. Sun et al., "MEMS-based endoscopic OCT", Int. J. of Opt., 2011. The disadvantage of these mirror-based solutions, however, is the still sequential scanning of spatially extensive objects, which reduces the speed that can be realized. An increase is possible only by means of increased scanning rates or by means of the parallelization of the measuring process orthogonally by the use of a plurality of channels.

Therefore, WO 2009/036861 describes probe heads in which the beam path of the measurement radiation is split into two channels, the emission and reception directions of which are oriented with respect to one another, and probe heads in which a plurality of spatially parallel channels are realized. In these approaches, the measurement channels can be used temporarily in parallel or sequentially, wherein either two or more separate measuring arrangements or alternatively a single measuring arrangement with a separation of the channels, e.g. by means of different polarization directions, are or is possible in the case of simultaneous use. Such an embodiment of the probe head allows measurement of edges or steps, for example. However, as a result of the polarization-dependent separation, the construction is complicated and the number of channels that can be realized is limited.

With regard to the underlying measurement principle, for optical coherence tomography very rapidly tunable sources are known, as described e.g. in T. Klein et al., "Megahertz OCT for ultrawide-field retinal imaging with a 1050 nm Fourier domain mode-locked laser", Opt. Express 19, 3044-3062 (2011), and very fast approaches exhibiting spectral resolution in the Fourier domain with high-speed line CCDs are also known, as described e.g. in Y. K. Tao et al., "High-speed complex conjugate resolved retinal spectral domain optical coherence tomography using sinusoidal phase modulation", Opt. Lett. 32, 2918 (2007).

However, both methods exhibit a deficiency of available coherence length, such as is required in the field of industrial metrology, e.g. for use in generic coordinate measuring machines or apparatuses.

For methods of optical coherence tomography in the time domain (time domain OCT) with broadband sources, this would require, on account of the short coherence length, additional scanning in the z-direction, i.e. in the surface normal of the surface to be measured, which in turn necessitates additional drives and increased complexity, cf. T. Dresel et al., "Three-dimensional sensing of rough surfaces by coherence radar", Appl. Opt. 31, 919 (1992).

Methods of optical coherence tomography in the frequency domain (frequency domain OCT), i.e. with spectral resolution, could be developed further in terms of their capability for parallel scanning by the use of an area sensor instead of a line sensor. However, the low frame rates or read-out speeds and the likewise low typical coherence lengths of the order of magnitude of a few millimeters are disadvantageous here.

In this case, the approach of frequency-modulated OCT can also be enhanced into the two- or three-dimensional scanning range by the use of line or area sensors. Since, on account of the required scanning of the interferogram with hundreds of data points, in this case a complete measurement also necessitates a corresponding recording of many hundreds of data fields by means of line or area sensor, such methods are very slow (<100 Hz) in comparison with typical FD-OCT methods, cf. e.g. S. W. Lee et al., "Line-field optical coherence tomography using frequency-sweeping source", IEEE J. Selec. Top. Quant. Electr. 14, 50 (2008).

One major shared disadvantage here is also the design used for the probe head in free space optics, the data being generated by line or area sensors. This means that it is no longer possible to spatially divide probe head and signal generation and signal processing with a connection by a monomode fiber. Besides the resultant increased complexity of the probe head and the increased mass thereof, in particular the heating of the probe head brought about by the current consumption has an adverse effect. In the field of coordinate measuring technology it is generally advantageous for the components that are moved over the surface to be fashioned as passively as possible, with the result that thermal influences that deform the carrier structure used for movement cannot arise. Moreover, a low mass of the components to be moved, but in particular of the probe head, leads to an improved dynamic range and to smaller acceleration-dependent deformations of the carrying structure.

SUMMARY

Some embodiments provide an improved distance measuring arrangement or a corresponding measuring apparatus for measuring surfaces or for detecting surface topographies and a corresponding method.

Some embodiments provide such an improved distance measuring arrangement and such a method which allows a measurement of a plurality or multiplicity of points without movement of the probe head in conjunction with low complexity of the construction and low thermal loading of the carrying structures.

The invention uses an interferometric measurement principle with a laser source that is modulated with regard to the wavelength, i.e. emits with variable wavelength, wherein the measurements are carried out in the frequency domain. In this case, the laser radiation generated by a laser, e.g. a laser diode, as laser source is modulated by a wavelength ramp being passed through and the optical frequency of the radiation thus being varied. A sinusoidal modulation, for example, is impressed on a central wavelength or optical frequency. The measured interferogram is then evaluated e.g. over half a period of the modulation frequency in which the optical frequency rises or falls monotonically, which is also referred to hereinafter as wavelength ramp. On account of the tunable laser as a very narrowband source, all interference effects lie in the same coherence range.

In this case, the wavelength ramp can be embodied as a traditional ramp, i.e. with a substantially linearly rising or falling sequence of wavelengths to be passed through. Alternatively, however, the set of different wavelengths can also be modulated randomly, i.e. in a manner deviating from the linearly ordered sequence, as long as only the set of wavelengths is detected and modulated once during an excursion of the ramp. The term wavelength ramp therefore encompasses in the broader sense a set of different wavelengths which can indeed be brought into an ascending or descending succession, but are not necessarily passed through and modulated in this succession. However, one preferred embodiment is designed with a sequence of alternately rising and falling linear ramps.

Methods and components suitable for this are described in WO 2009/036861 or the European patent application having the application 11171582.7. The invention is based on the fact that at least two optical transmission channels are realized which can also be used for reception, wherein a temporally parallel emission of the measurement radiation takes place. According to the invention, for a given emission instant each of the channels is allocated a subrange of the wavelength ramp to be passed through, i.e. a wavelength and frequency band, which is assigned the radiation emitted at this instant with regard to its wavelengths to be modulated.

Each channel can be allocated a fixed subrange of the wavelength ramp, which is passed through only for the measurement radiation emitted via this channel, i.e. the measurement radiation emitted via other channels is not modulated with this part of the wavelength ramp. In comparison with the wavelength ramp, a modulation is carried out with a smaller excursion, i.e. the wavelength ramp is split into discrete partial ramps and the overall modulation is split into partial modulations. In this case, the wavelength ramp can be split in its entirety along all channels uniformly or else non-uniformly, i.e. with non-uniform wavelength excursion per channel. In principle, however, part of the wavelength ramp can also remain unused or be used for other purposes, e.g. for an internal calibration or reference measurement. A component-side realization of this approach can be implemented for example by a chromatic separation by means of beam splitters, in particular also by a stepped sequence of beam splitters. A separability of the channels thus arises statically as a result of their fixed spectral division after the generation of the radiation.

The chromatic multiplexing brought about as a result thus uses the large width (100 to 200 nm) of the wavelength ramp of available sources which is split into subranges. Although this does not influence the usable coherence length provided by the dynamic line width of the modulated laser, it does reduce the spatial resolution in the extent of the parallelization. On account of the high accuracy ($3\sigma \sim 20\text{-}30$ nm) of optical coherence tomography in the spatial frequency domain, a reduction of the measurement accuracy for technical surfaces can usually be accepted without any problems.

According to the invention, therefore, by means of at least one chromatic beam splitter channels for the parallel emission of measurement radiation are defined, which are allocated in each case a different subrange of the wavelength ramp for a selected emission instant. Each channel has at this selected emission instant at its output, i.e. in the emission direction, a different spectral distribution specifically present, hence a different chromatic characteristic. In the case of the chromatic separation with static allocation of a discrete wavelength range, at an emission instant under consideration the channel that emits is then only ever the one channel whose wavelength range and subrange of the wavelength ramp passed through at this instant correspond. Consequently, the spectral separation in the arrangement takes place discretely, e.g. in a range of 2 to 10 μm, such that discrete ranges can be defined in which the constant phase gradient can be evaluated.

In addition, the chromatic multiplexing can be combined with frequency division multiplexing, in which the possible measurement range predefined by the coherence length, i.e. the total measurement depth that can be realized, is split on the distance side as a result, such that the zero position is shifted for each of the channels. Each channel is thus assigned a subrange of the measurement range with its respective measurement depth, and the respective shift of the zero position for a channel is known and can therefore be taken into account in the measurements or the evaluation thereof. The channels thus measure the same distance as the end result despite different zero positions in the case of a smooth surface, for which purpose differently staggered distances are generated before the signal processing by means of delay sections, which distances are known and correspondingly taken into account in the evaluation. To put it another way, the reference points for the measurements are shifted from channel to channel, but can be matched computationally. The maximum limit of such staggering is limited here by the maximum measurement range and therefore by the coherence length.

By means of the different delays for the channels, the measurement range defined by the coherence length is split into individual portions and the coherence length is thus subdivided. The Fourier spectrum or tomogram in the case of technical measurements of surfaces that are opaque to the measurement radiation, in particular for metal surfaces, normally exhibits only a single maximum. Consequently, a large part of the space in the frequency domain is not used for the measurement. A parallelization can be achieved by means of the splitting of the entire measurement range available on account of the given coherence length of the source. In this case, the achievable accuracy can be maintained, in principle, but as a result of the splitting the energy is distributed among the different channels, although this can be compensated for by the use of amplifiers.

This displacement of the zero points for the different channels by means of delaying division sections, which is referred to as frequency division multiplexing, has a structurally compact embodiment in which the delaying effect is realized by different path lengths in media, such as, e.g. glasses.

In addition, in order to avoid crosstalk, it is possible to use coherence delay sections whose relative length spacing between successive channels is in each case greater than the coherence length.

It is thus possible according to the invention to realize an interferometric distance measuring arrangement according to the principle of optical coherence tomography in the frequency domain in which, in the case of parallelization of the measuring process, it becomes possible to implement a separation of probe head and signal processing and the connection thereof via an individual monomode fiber. The probe head to be moved over the surface can thereby be designed in an electronically passive fashion and without the generation of thermal loading. The use of chromatic multiplexing, in particular also in combination with frequency division multiplexing, makes it possible to keep the measurement rate for the parallelized measurement with line- or matrix-type arrangement of the channels at the level of the individual-point measurement.

BRIEF DESCRIPTION OF THE DRAWINGS

Distance measuring arrangements according to the invention are described or explained in greater detail purely by way of example below on the basis of exemplary embodiments illustrated schematically in the drawing, in which specifically.

DETAILED DESCRIPTION

Figure 1:
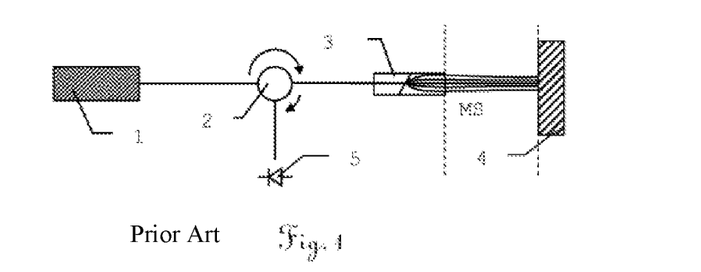
FIG. 1 shows the schematic illustration of the interferometric measuring arrangement in a measuring apparatus from the prior art for measuring surfaces.

FIG. 1 shows the schematic illustration of the interferometric measuring arrangement in a measuring apparatus from the prior art for measuring surfaces, as is described e.g. in WO 2009/036861 A1 or the European patent application having the application 11171582.7. Such an arrangement uses a wavelength-modulated laser, in particular only a single laser, e.g. a laser diode, as laser source 1 for generating at least one laser beam and a radiation detector 5 for receiving the measurement radiation MS backscattered from a surface 4. In this case, the modulated laser source is preferably designed such that the laser used herein has a coherence length of more than 1 mm, in particular in the range of 1 millimeter to 20 centimeters, e.g. a central wavelength of between 1.3 and 1.7 µm and a tunable wavelength range of more than 40 nm in the case of a dynamic line width of less than 0.02 nm in the case of a coherence length of 60 nm or more. The coherence length thus also allows measurements over a depth or distance range of a few centimeters.

The laser radiation generated by the laser source 1 is coupled via an optical circulator 2 into the interferometer construction used for measurement, said interferometer construction being embodied using common path geometry, for example, that is to say having a partly common interferometer beam path for measurement arm and reference arm. In this case, the reference arm is defined by a reflection at the optical exit surface of a gradient-index lens, such that a constant, in particular known, distance is defined, wherein further back reflections are avoided. Therefore, the reference surface lies in a transmitting/receiving optical unit 3 integrating the components of the transmitting and receiving optical unit within the beam shaping optical unit used for emitting the laser beam. By contrast, the measurement arm is defined by the reflection at the surface 4 to be measured. The back reflected light of measurement arm and reference arm is finally passed via the optical circulator 2 again onto the radiation detector 5, which is preferably embodied as an InGaAs detector having a bandwidth of more than 100 MHz. Finally, the distance d to be measured can be determined in an evaluation unit (not illustrated here).

In addition, it is also possible to use a calibration interferometer (not illustrated here) with an optical detector for taking account of or compensating for nonlinearities in the tuning behavior, wherein said calibration interferometer can be embodied in particular in an etalon or Mach-Zehnder configuration.

Figure 2:
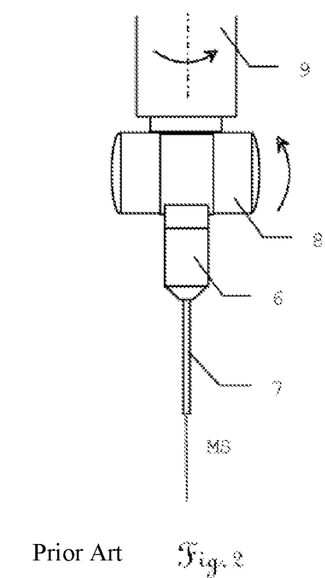
FIG. 2 shows the illustration of the structural construction of a probe head for a corresponding measuring apparatus.

Such a distance measuring arrangement can be integrated e.g. into a probe head of a coordinate measuring apparatus for scanning measurement, such as is known e.g. from WO 2009/036861 A1. FIG. 2 illustrates the structural construction of such a probe head for a corresponding measuring apparatus. In this case, the coordinate measuring apparatus has guide means for guiding the probe head in a defined scanning fashion over the surface to be measured, and the probe head has at least one emission and reception beam path for the emission of the measurement radiation MS of the interferometric distance measuring arrangement.

The probe head is guided, in a manner defined by an arm element 9 and a joint 8 as guide means, in a scanning fashion over the surface to be measured, wherein a rotation of the joint 8 relative to the arm element 9 is also possible. By virtue of the rotatability relative to the arm element 9 and the subsequent joint 8, the probe head can readily follow angled or greatly variable surface profiles. In principle, however, even further rotational or translational degrees of freedom can be integrated into the guide means in order to enable further improved guidance of the probe head.

The probe head has at least one surface-side emission and reception beam path of the measurement beam MS. In this exemplary embodiment, the beam paths are led through a thin tube as probing element 7, which includes the transmitting/receiving optical unit. In the thicker base part 6 of the probe head adjacent to said tube, it is possible to arrange actually the radiation detector itself or else optical waveguides for relaying to a radiation detector integrated elsewhere, wherein an interface for the optical and/or electrical transfer of signals and a coupling between base part 6 of the probe head and joint 8 ensures exchangeability.

Figure 3:
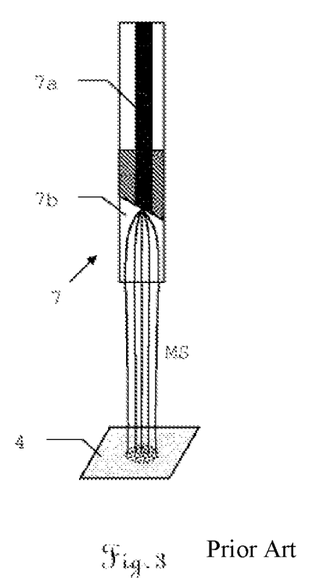
FIG. 3 shows the schematic illustration of transmitting and receiving optical unit for a corresponding measuring apparatus.

FIG. 3 schematically shows the integration of transmitting/receiving optical unit into the tube of the probe head. In this configuration, a fiber 7a serves for guiding the measurement radiation to be emitted and also the internally reflected measurement radiation and the measurement radiation MS that is externally reflected and received again. In this case, the emission takes place through a gradient-index lens 7b which is arranged in the tubular part and which emits the measurement radiation onto the surface 4 to be measured and couples the measurement radiation MS reflected from there into the fiber 7a again. However, the solutions in the prior art are mainly designed only for individual measurements, wherein surfaces can also be detected continuously by the probe head being guided in a scanning fashion.

Figure 4:
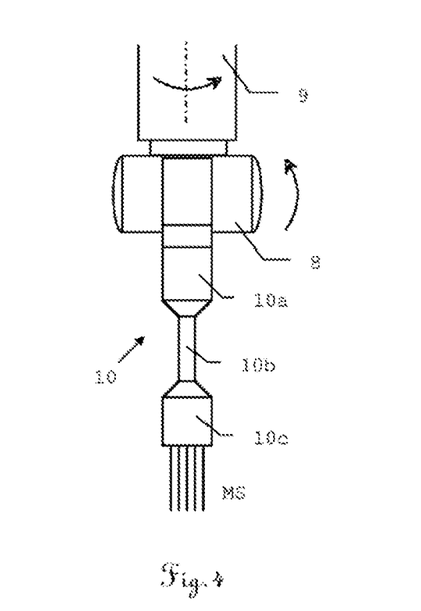
FIG. 4 shows the illustration of the structural construction of a probe head for a distance measuring arrangement according to the invention.

The approach according to the invention, however, allows improved parallelization and the realization of a plurality or multiplicity of separately evaluatable measurement channels, such that the structural construction of a probe head 10 as shown in FIG. 4 with a plurality of channels becomes possible in conjunction with simple structural construction, wherein by means of at least one beam splitter n≥2 channels for the parallel emission and in particular also the parallel reception of measurement arm radiation are defined, which are allocated in each case a different subrange of the wavelength ramp for a given emission instant, such that separate reception with dedicated, separate evaluation and distance measurement can be realized for each of the channels.

The probe head 10 comprising a distance measuring arrangement according to the invention now has a base part 10a, in which laser source and evaluation electronics can be arranged. Alternatively, however, these components can also be part of a different component of the measuring apparatus, wherein an optical and/or electronic connection between joint 8 and the base part 10a of the probe head 10 is then provided via one or a plurality of interfaces. Preferably, the base part 10a of the probe head is connected to the optical unit part 10c via a connection tube 10b, wherein the connection tube 10b has an optical guide. Alternatively, however, it is also possible to use arrangements deviating therefrom for realizing the distance measuring arrangement according to the invention. In this regard, for example, it is also possible to concentrate all the components of the probe head 10 in a single, compact unit, such that the connection tube 10b is omitted.

Consequently, the probe head 10 comprises all or the majority of the components of the interferometric distance measuring arrangement according to the invention for measuring surfaces, wherein said arrangement is configured, in particular, according to the principle of optical coherence tomography. For this purpose, the laser source, which is tunable with regard to the wavelength, is modulated for generating measurement radiation MS by virtue of the modulation passing through a linear wavelength ramp or selecting the wavelength in some other, not necessarily linear, succession from a set of different wavelengths. An optical beam path is formed in the probe head 10, wherein a transmitting optical unit for emitting the measurement radiation MS onto the surface and a receiving optical unit for receiving the measurement radiation MS backscattered from the surface are formed in the optical unit part 10c. In this case, transmitting optical unit and receiving optical unit preferably use the same components, such that both optical units are embodied in an integrated design as a combined transmitting and receiving optical unit, which is coupled to the radiation detector via a, in particular a single, monomode fiber. A measurement arm and a reference arm are defined or formed in the beam path in a manner identical to the prior art, wherein this interferometer is configured in particular with a partly common beam path of measurement arm and reference arm as a common path interferometer. The radiation detector and an evaluation unit for determining the distance from a reference point of the distance measuring arrangement to the surface can be arranged either in the base part 10a of the probe head 10 or else outside the probe head, wherein in the latter case the probe head dispenses with electronic components and can thus be kept completely passive.

In the base part 10a, the laser radiation can be split by at least one beam splitter, such that at least two channels for the parallel emission of measurement radiation MS are defined, which according to the invention are allocated in each case a different subrange of the wavelength ramp for a given emission instant. This means that for a given instant each channel is allocated a different wavelength range which is used for this channel for modulating the measurement radiation. In this case, all channels emit either simultaneously or else successively in the course of passing through the wavelength ramp. For this purpose, the wavelength ramp can be split into a number of frequency bands of identical width, which number corresponds to the number of channels, wherein each of the channels is allocated one of the wavelength bands. Alternatively, however, a range of the wavelength ramp or of the spectral modulation depth can also remain unused or be used outside the channels for a different purpose, e.g. for determining nonlinearities in the modulation. Likewise, the wavelength ramp can be divided non-uniformly by subranges or frequency bands of different widths being allocated to the different channels statically or dynamically. By this means, for example, channels having different measurement characteristics can be realized, e.g. if, in the case of a measurement of drilled holes, channels for measuring the inner surface with high precision are realized in parallel with a channel of low accuracy for positioning in the longitudinal axis of the drilled hole. Likewise, the channels can be allocated temporally variable widths of the frequency bands, such that temporally variable measurement ranges or measurement accuracies can be realized.

Figure 5:
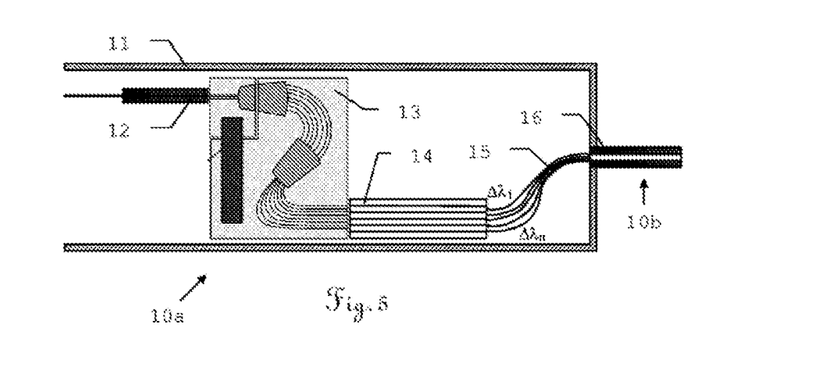
FIG. 5 shows the schematic illustration of a first part of the beam path for a first exemplary embodiment of the distance measuring arrangement according to the invention with static allocation of spectral ranges.

FIG. 5 shows the first part of the beam path for a first exemplary embodiment of the distance measuring arrangement according to the invention, said first part being formed in the base part of the probe head.

In this first exemplary embodiment, the wavelength ramp is split into a number of wavelength bands of identical width, which number corresponds to the number of channels, wherein the subranges of the wavelength ramp are produced by chromatic separation. For this purpose, the laser radiation generated by the laser of the laser source is coupled via an optical fiber and a ferrule 12 for this individual fiber into an arrayed waveguide grating as beam splitter 13, which is located in the housing 11 of the base part. Such an arrayed waveguide grating can produce chromatic multiplexing by subdividing the tuning range or the wavelength ramp into different branches or subranges. For a tuning range of between 1500 and 1600 nm, it is possible to use components from the field of telecommunications for the c and l bands. In this regard, arrayed waveguide gratings are used in this area in order to divide a channel into different separate so-called ITU channels. In this case, the width of the channels depends on the ITU standard used, said width ranging from 50, 100 or 200 GHz to a few nanometers. Such a beam splitter makes it possible to realize a chromatic or spectral splitting of the laser radiation into different channels, in particular a multiplicity of channels, wherein an arrayed waveguide grating as beam splitter 13 acts like a compact spectrometer. At the output of the beam splitter 13, the measurement radiation divided into channels is coupled via a multi-fiber ferrule 14 into individual optical fibers 15, each of which is assigned one of the frequency or wavelength ranges $\Delta\lambda_1$-$\Delta\lambda_n$. The fibers 15 are guided as fiber bundle 16 via the connection tube 10b into the optical unit part 10c of the probe head, said optical unit part being illustrated in FIG. 6.

Figure 6:
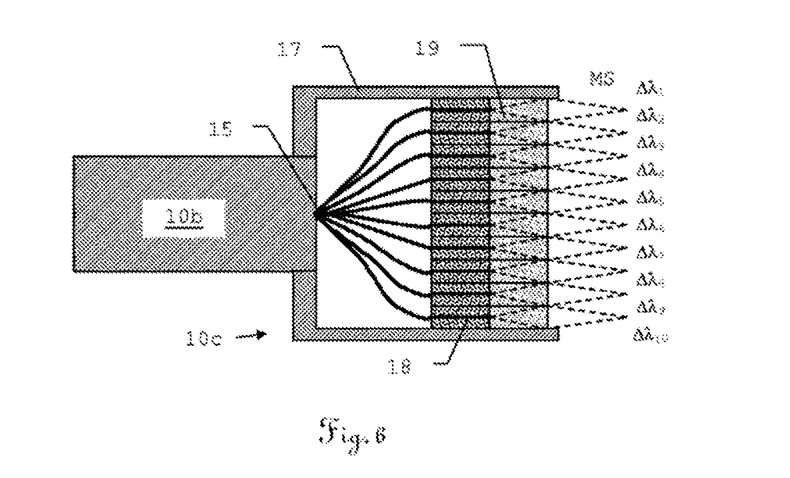
FIG. 6 shows the schematic illustration of a second part of the beam path for the first or second exemplary embodiment of the distance measuring arrangement according to the invention.

Said FIG. 6 illustrates the second part of the beam path for the exemplary embodiment of the distance measuring arrangement according to the invention, wherein the division in the base part is in turn followed by coupling into optical fibers 15. The optical fibers 15 guided via the connection tube 10b are coupled in the interior of the housing 17 of the optical unit part 10c via individual-fiber ferrules 18 into a line of gradient-index lenses 19, via which the measurement radiation is emitted with the wavelength ranges $\Delta\lambda_1$-$\Delta\lambda_{10}$, which are different for each of the—here in accordance with the first exemplary embodiment—ten channels of this exemplary embodiment. The position of the local oscillator of the reference arm can be defined by a suitable, reflective dielectric coating for example at the transition from ferrule 18 to gradient-index lens 19 or else at the transition from gradient-index lens to air. The beam paths of reference arm and measurement arm thus exhibit a maximum overlap for a common path geometry. By means of the components used for the transmission process, the measurement radiation reflected back from the surface is likewise received, with the result that such a probe head realizes an integrated transmitting/receiving optical unit having a line of ten microlenses, each of which is assigned one of the chromatically separated and separately evaluatable measurement channels, such that a plurality of transmission and reception channels are realized. Since the usable coherence length is not impaired by the chromatic multiplexing, there is great flexibility with regard to the configuration of the beam guiding, wherein each channel can be designed independently, e.g. with regard to collimation or beam cross section.

Figure 7:
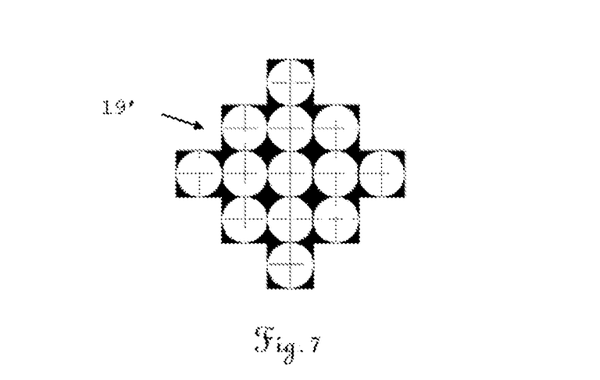
FIG. 7 shows the schematic illustration of the aperture arrangement of a transmitting and receiving optical unit for a distance measuring arrangement according to the invention.

As an alternative to the line-like manner of arrangement illustrated in FIG. 6, however, it is also possible to use a matrix-like aperture arrangement 19' of a transmitting and receiving optical unit for a distance measuring arrangement according to the invention, such as is illustrated schematically in FIG. 7. With such two-dimensional microlens or aperture arrangements, areally extensive structures, in particular, can be measured rapidly and in a parallelized fashion.

Figure 8:
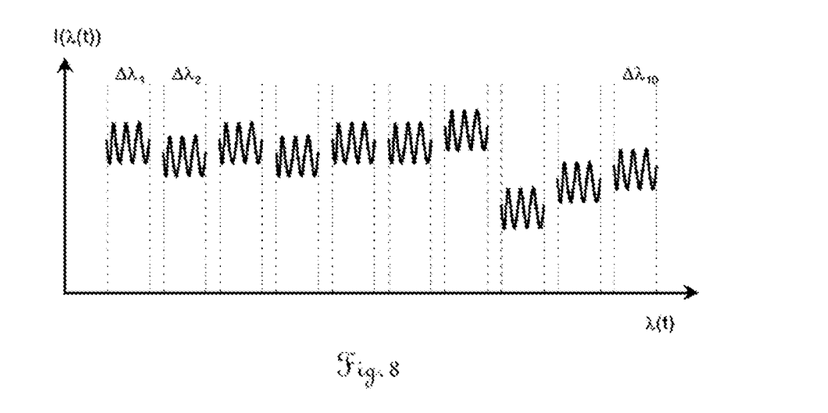
FIG. 8 shows the schematic illustration of the profile of the detected intensity versus the wavelength for the different subranges of the wavelength ramp that are assigned to the channels.

FIG. 8 shows the schematic illustration of the time-dependent profile of the detected intensity $I(\lambda(t))$ versus the wavelength $\lambda(t)$ for the different subranges $\Delta\lambda_1$-$\Delta\lambda_{10}$ of the wavelength ramp which are assigned to the channels in the case of multiplexing in the frequency domain. The intensity profile is thereby divided into different smaller interferograms. During the signal processing, the recorded intensity profile is divided into the channels and thereby discretized, wherein each channel is subsequently processed separately. The aim consists in determining the frequency of the channel interferogram, by means of Fourier transformation and a geometrical centroid determination in the frequency domain. The frequency determined is proportional to the target distance, i.e. the distance to the surface to be measured.

Figure 9A:
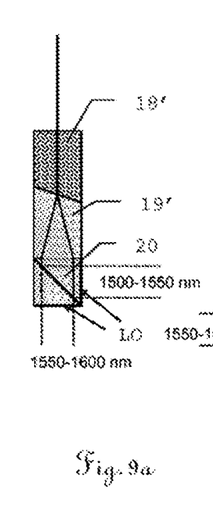
FIGS. 9a-c show the schematic illustration of a third, fourth and fifth exemplary embodiment of the distance measuring arrangement according to the invention with static allocation.
Figure 9B:
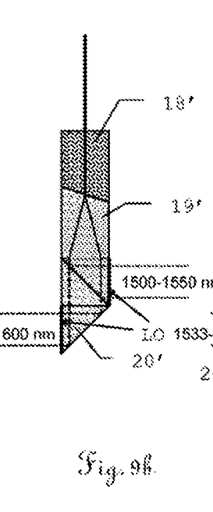
Figure 9C:
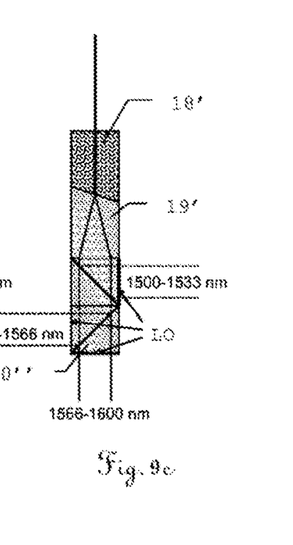

FIGS. 9a-c schematically illustrate a third, fourth and fifth exemplary embodiment of the distance measuring arrangement according to the invention. Besides the probe head with a plurality of channels as illustrated in FIG. 6, a smaller number of channels can also be realized according to the invention, e.g. if this suffices for the respective measurement application. In such cases, the chromatic beam splitting can also be effected within the components of the transmitting optical unit that are disposed directly upstream of the emission. By means of chromatic beam splitters with layers coordinated toward the respective separation, in the beam path a respective channel can be separated off and thus guided in a different direction. The channels are thus separated off by means of beam splitting with layers coordinated with the respective separation.

In this regard, FIGS. 9a-c show three different exemplary embodiments in which the optical fiber is always connected to a gradient-index lens 19' via a ferrule 18' and the laser radiation is modulated in a wavelength range of 1500-1600 nm. Subsequently, in FIGS. 9a-b, a first channel with the wavelength band 1500-1550 nm as subrange of the wavelength ramp is coupled out from the beam path by a beam splitter 20, wherein the remaining subrange with the wavelength band 1550-1600 nm is emitted as second channel.

For this purpose, in FIG. 9b, the emission direction is deflected by a mirror surface or interface 20', with the result that such an arrangement can be used to scan e.g. drilled holes or cylinder openings in engines, wherein, on account of the emission in two opposite directions, only half a revolution of the probe head suffices for scanning the full circle.

FIG. 9c shows a similar configuration, in which, however, a total of three channels with the wavelength bands 1500-1533 nm, 1533-1566 nm and 1566-1600 nm are defined by means of two beam splitting mirror surfaces 20".

In all three exemplary embodiments in FIGS. 9a-c, during a collimation of the measurement radiation for each of the channels one of the ends of the local oscillator used as reference arm can be defined by the exit surface LO of the measurement radiation, resulting in largely identical beam paths using common path geometry for measurement arm and reference arm. According to the invention, however, it is also possible to use other beam guiding, in particular beam deflections, and different beam shapings, e.g. by the measurement radiation being focused onto the surface.

Figure 10:
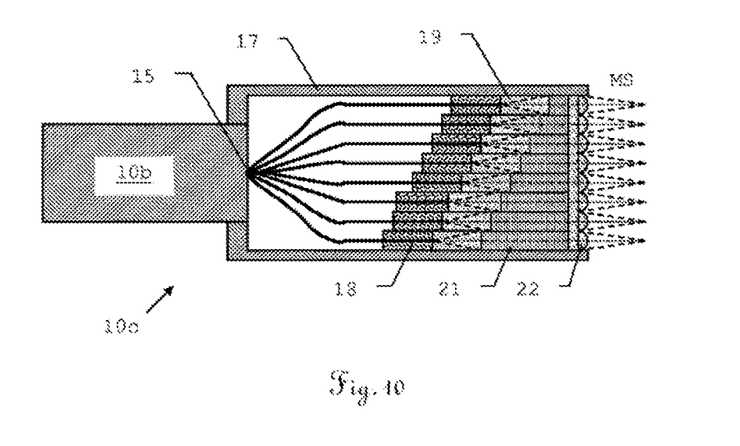
FIG. 10 shows the schematic illustration of a second part of the beam path for a sixth exemplary embodiment of the distance measuring arrangement according to the invention with additional delay sections.
Figure 11:
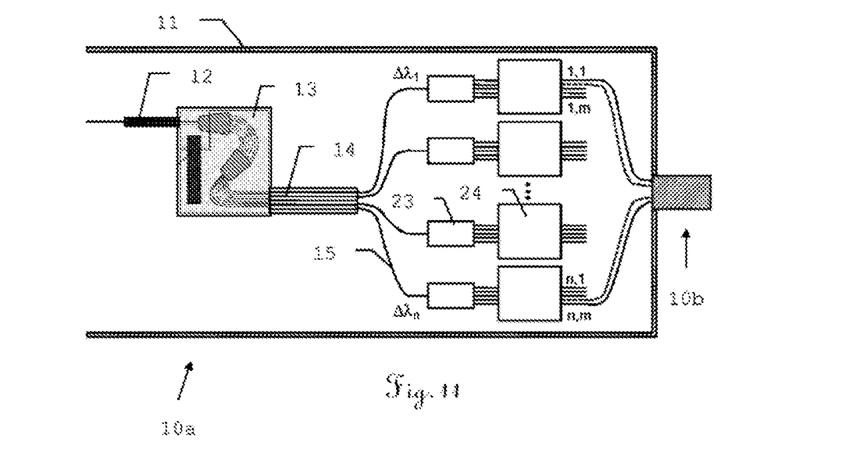
FIG. 11 shows the schematic illustration of a first part of the beam path for the sixth exemplary embodiment of the distance measuring arrangement according to the invention.

The principle of chromatic division can additionally be combined with the approach of frequency division multiplexing as described in the European patent application having the filing number 1739811 and the application number EP12177582.9. In this respect, FIG. 10 and FIG. 11 show the schematic illustration of a sixth exemplary embodiment of the distance measuring arrangement according to the invention, in which the possible measurement range predefined by the coherence length is divided on the distance side as a result, such that a shift of the zero position and thus of the spatial reference point is effected for each of the channels. In the case of a smooth surface, all channels would measure the same distance as the end result, for which purpose differently staggered distances are generated before the signal processing by means of delay sections, which distances are known and correspondingly taken into account in the evaluation. Thus, the reference points for the measurements are shifted from channel to channel, but can be matched computationally. The maximum limit of such staggering is determined here by the maximum measurement range and therefore by the coherence length predefined on the source side.

FIG. 10 shows the schematic illustration of a second part of the beam path for a sixth exemplary embodiment of the distance measuring arrangement according to the invention with such additional delay sections. The optical unit part 10c is connected via the connection tube 10b of the probe head to the base part 10a, in which the optical fibers 15 of the channels also run.

In the housing 17 of the optical unit part 10c, the fibers 15 are coupled via respectively assigned ferrules 18 into gradient-index lenses 19, which function as collimators. In this case, the respective transition from ferrule 18 to gradient-index lens 19 constitutes the back reflecting surface for defining the reference arm using common path geometry. At least for n−1 of the n channels, there is disposed downstream of the gradient-index lens 19 of each channel an individual delay section for the measurement radiation MS, which can be realized in particular by glass elements 21 of different lengths, which are chosen in terms of their lengths such that each of the channels is assigned a different fraction of the coherence length or of the maximum measurement range.

The ends of the delay sections 21 are connected to a line or a matrix of microlenses 22, depending on the aperture geometry. On account of the delay section, each channel now has an individual length $L_i$—determined by the respective glass element 21 as delay section—between focal point as target surface and transition ferrule 18 to gradient-index lens 19.

These lengths $L_i$ and the delays brought about thereby allow separation of the channels in the Fourier domain during the signal processing. In this exemplary embodiment, too, an integrated transmitting and receiving optical unit is used, such that the measurement radiation MS reflected back from the surface to be measured is again passed via the microlenses 22 and glass element 21 and also the further components. After passing through them, the detected signals are again combined by a beam splitter and coupled into a single monomode fiber and guided by means of the latter to the radiation detector, which in particular can also be arranged outside the probe head, which is then electronically passive. In this case, losses caused by the beam splitter can be compensated for again by amplifiers connected downstream.

In addition to the delay sections in the optical unit part 10c, it is possible to use coherence delay units in order to avoid crosstalk between the channels. The integration of coherence delay units into the base part 10a is shown in FIG. 11 for the first part of the beam path for the sixth exemplary embodiment of the distance measuring arrangement according to the invention, in which the two approaches of static chromatic separation and frequency division multiplexing are combined with one another.

In the housing 11 of the base part 10a, an arrayed waveguide grating as chromatic beam splitter 13 is disposed downstream of the monomode fiber with ferrule 12, as is also shown in FIG. 5 or the first exemplary embodiment. Downstream of the output of the beam splitter 13, the measurement radiation divided into channels is in turn coupled via a multi-fiber ferrule 14 into n individual optical fibers 15, each of which is assigned one of the frequency or wavelength ranges $\Delta\lambda_1$-$\Delta\lambda_n$. The fibers 15, for their part, are guided in each case to a non-chromatic 1×m beam splitter 23. Downstream of each of the beam splitters 23 there are disposed in turn coherence delay units 24, whose outputs indexed from 1,1 to n,m are combined to form a fiber bundle and guided to the optical unit part via the connection tube 10b in a manner identical to the other exemplary embodiments. The succession of chromatic beam splitting 13 with downstream coherence delay units 23 and 24 as shown in this example is not mandatory here and can also be reversed in particular in its order. The channels have, in the coherence delay units, coherence delay sections for avoiding crosstalk between the channels, which can be embodied in particular as optical fibers. The relative length spacing $\Delta L_i$ from channel $L_i$ to channel $L_{i+1}$ here is in each case greater than the coherence length $L_{coh}$ of the laser source $$\Delta L_i = L_{i+1} - L_i > \frac{L_{coh}}{2}$$

These coherence delay sections serve here merely for avoiding crosstalk, and so they can be dispensed with under certain circumstances, for example given a sufficiently large spacing of the channels.

Figure 12:
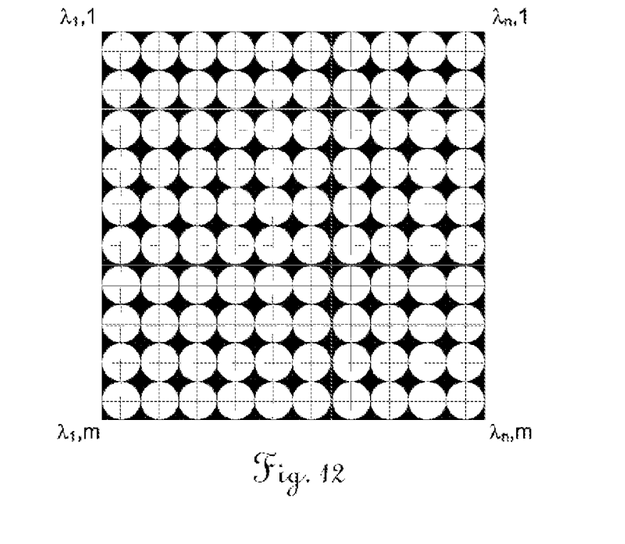
FIG. 12 shows the schematic illustration of one exemplary embodiment for the transmitting and receiving optical unit of the sixth exemplary embodiment of the distance measuring arrangement according to the invention.

The apertures of the different channels can be arranged in a matrix-like fashion in particular in the succession shown in FIG. 12.

Figure 13:
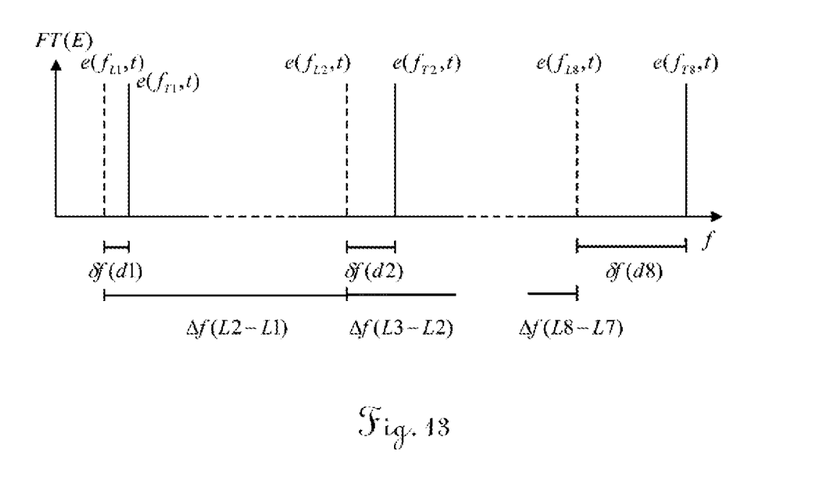
FIG. 13 shows the schematic illustration of the distribution of the E-fields in the frequency domain for the sixth exemplary embodiment of the distance measuring arrangement according to the invention.

FIG. 13 illustrates the distribution of the E-fields or the Fourier transforms FT(E) thereof in the frequency domain for the basic principle of frequency division multiplexing which is employed in the sixth exemplary embodiment of the distance measuring arrangement according to the invention. At an instant t the frequency spectrum consists of contributions of different electromagnetic fields, wherein each channel i has a signal of the local oscillator $e(f_{Li},t)$ and a signal of the target or of the target surface $e(f_{Ti},t)$. The channels here are spaced apart in the frequency domain in each case as follows $$\Delta f_{ck\_i} = \frac{2\Delta L_i \cdot \gamma}{c}$$

wherein c denotes the speed of light and γ denotes the tuning rate of the modulation of the laser source, e.g. 20 THz/ms.

Besides the large spacings $\Delta f_{ch\_i}$ of the channels with respect to one another, each channel splits into the two signal components of the local oscillator LO, i.e. of the reference arm, and of the target, i.e. of the measurement arm, with the spacing $$\delta f_{ch\_i} = \frac{2\delta L_i \cdot \gamma}{c},$$

where $\delta L_i = L_{target\_i} - L_{LO\_i}$
wherein $L_{LO\_i}$ and $L_{target\_i}$ denote the respective lengths of reference arm and measurement arm, and so the difference $L_i$ between them corresponds to the sought distance to the surface. The determination of these sought distances to the surface to be measured is known, in principle, from the prior art as described for example in WO 2009/036861 or the European patent application having the application 11171582.7.

Figure 14:
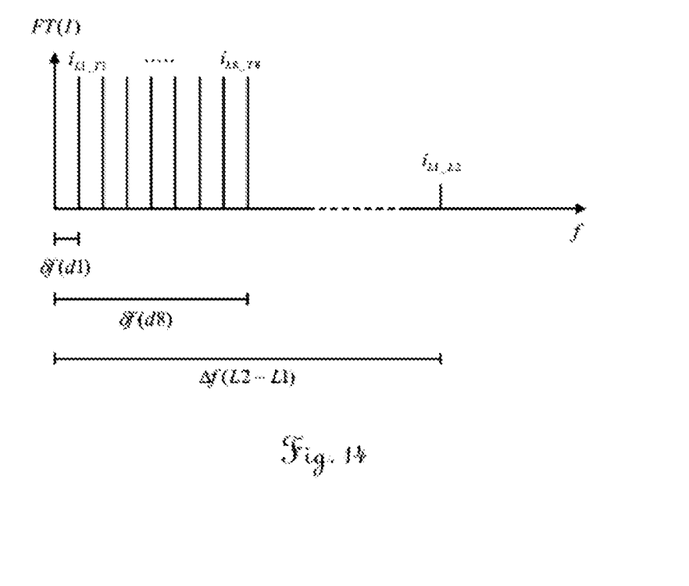
FIG. 14 shows the schematic illustration of the distribution of the detected intensities from a plurality of interferograms in the frequency domain for the sixth exemplary embodiment of the distance measuring arrangement according to the invention.

FIG. 15 shows the corresponding schematic illustration of the distribution—consisting of a plurality of interferograms—of the detected intensities or the Fourier transforms FT(I) thereof in the frequency domain for the sixth exemplary embodiment of the distance measuring arrangement according to the invention.

What is claimed is:

1. An interferometric distance measuring arrangement designed to measure surfaces according to optical coherence tomography, the interferometric distance measuring arrangement, comprising:
    a tunable laser having a coherence length for generating measurement radiation modulated with a wavelength ramp, wherein a coherence length of the laser defines the measurement range,
    an interferometer comprising a measurement arm and a reference arm structurally comprised of transmitting and receiving optics designed to emit the measurement radiation having an optical beam path onto a surface and to receive the measurement radiation backscattered from the surface, and
    a radiation detector and evaluation electronics designed to determine interferometrically the distance from a reference point of the distance measuring arrangement to the surface;
    at least one chromatic beam splitter or arrayed waveguide grating arranged in the optical beam path of the measurement radiation such that is brings about a division of the measurement radiation; and
    n≥2 fiber optic measurement channels optically coupled with the at least one chromatic beam splitter or arrayed waveguide to receive the divided measurement radiation for parallel emission of measurement radiation onto the surface, whereby each of the fiber optic measurement channels is allocated a different subrange of the wavelength ramp for a given instant of emission of measurement radiation onto the surface.

2. The distance measuring arrangement as claimed in claim 1, wherein:
    each of the fiber optic measurement channels is allocated a different wavelength band of the wavelength ramp by the at least one chromatic beam splitter or arrayed waveguide grating, wherein all wavelength bands have of identical width.

3. The distance measuring arrangement as claimed in claim 1, wherein:
    the wavelength ramp is split discretely into n wavelength bands of identical width by the at least one chromatic beam splitter or arrayed waveguide grating, wherein each of the fiber optic measurement channels is allocated one of the wavelength bands.

4. The distance measuring arrangement as claimed in claim 1, wherein:
    the subranges of the wavelength ramp are generated by chromatic separation by the at least one chromatic beam splitter or arrayed waveguide grating.

5. The distance measuring arrangement as claimed in claim 3, wherein:
    the at least one chromatic beam splitter or arrayed waveguide grating is the arrayed waveguide grating.

6. The distance measuring arrangement as claimed in claim 3, wherein:
    a chromatic separation is effected by the at least one chromatic beam splitter or arrayed waveguide grating for coupling out a subrange of the wavelength ramp, whereby the at least one beam splitter or arrayed waveguide grating is arranged within the optical beam path disposed directly upstream of the parallel emission of measurement radiation.

7. The distance measuring arrangement as claimed in claim 1, wherein:
    transmitting optics and receiving optics are embodied as a combined transmitting and receiving optical unit which is coupled to the radiation detector via a monomode fiber.

8. The distance measuring arrangement as claimed in claim 7, wherein:
    the monomode fiber comprises a single monomode fiber.

9. The distance measuring arrangement claimed in claim 1, wherein:
    the fiber optic measurement channels are arranged in the transmitting optical unit in a line-arrangement or matrix-arrangement.

10. The distance measuring arrangement as claimed in claim 1, wherein:
    by means of delay sections of different lengths the fiber optic measurement channels are allocated in each case a different subrange of the measurement range defined by the coherence length.

11. The distance measuring arrangement as claimed in claim 10, wherein:
    the transmitting optics comprises a ferrule, an optical fiber and a glass element, whereby the ferrule couples the optical fiber to the glass element and at least one of the channels has an individual length $\delta Li$ between a focal point as target surface and a transition from the glass element to the ferrule, the length being determined by the respective glass element as delay section.

12. The distance measuring arrangement as claimed in claim 1, wherein: the interferometer includes a partly common beam path of the measurement arm and the reference arm.

13. An interferometric distance measuring method for measuring surfaces according to the principle of optical coherence tomography, the method comprising:
generating measurement radiation modulated with a wavelength ramp by means of a laser having an coherence length, wherein a coherence length of the laser defines the measurement range,
emitting the measurement radiation onto a surface,
receiving the measurement radiation backscattered from the surface the backscattered radiation serving for determining interferometrically the distance from a reference point of the distance measuring arrangement to the surface, wherein:
the measurement radiation is emitted onto the surface by at least one chromatic beam splitter or arrayed waveguide grating in parallel via n≥2 fiber optic channels, wherein the fiber optic channels are allocated in each case different subranges of the wavelength ramp for a given instant of emission of measurement radiation onto the surface, wherein the fiber optic channels are arranged in the transmitting optics in a line or matrix fashion.

14. The distance measuring method as claimed in claim 10, further comprising:
splitting the wavelength ramp into n wavelength bands of identical width with the at least one chromatic beam splitter or arrayed waveguide grating, and allocating each of the channels one of the wavelength bands.

15. The distance measuring method as claimed in claim 14, further comprising:
splitting the wavelength ramp discretely into n wavelength bands of identical width with the at least one chromatic beam splitter or arrayed waveguide grating, and allocating each of the channels one of the wavelength bands.

16. The distance measuring method as claimed in claim 10, further comprising:
generating the subranges of the wavelength ramp by chromatic separation with the at least one chromatic beam splitter or arrayed waveguide grating.

17. The distance measuring method as claimed in claim 10, further comprising:
allocating the channels in each case a different subrange of the measurement range defined by a coherence length.

18. The distance measuring method as claimed in claim 13, further comprising:
allocating the channels by means of delays of different time durations in each case a different subrange of the measurement range defined by a coherence length.

* * * * *